May 22, 1962

J. O. KLEINSCHMIDT 3,036,221

BISTABLE TRIGGER CIRCUIT

Filed Nov. 6, 1959

INVENTOR.
J. O. KLEINSCHMIDT

BY Robert Harding Jr.

Attorney

United States Patent Office 3,036,221
Patented May 22, 1962

3,036,221
BISTABLE TRIGGER CIRCUIT

Johann O. Kleinschmidt, Korntal, Wurttemberg, Germany, assignor to International Standard Electric Corporation, New York, N.Y., a corporation of Delaware
Filed Nov. 6, 1959, Ser. No. 851,387
Claims priority, application Germany Nov. 7, 1958
3 Claims. (Cl. 307—88)

The present invention relates to a bistable trigger circuit comprising two operating circuits, of which one is conductive while the other is non-conductive, and in particular to a transistorized flip-flop circuit. Such types of trigger circuits are well known from the fields of computing machines. However, they bear the disadvantage that in the event of an absence of the operating voltages, the informations which are stored in the flip-flop will go astray. For this reason, in the case of data-processing systems, in addition to the flip-flop storage circuits, such as counting chains, shifting registers, and the like, permanent storage devices are provided permitting the transference of a defined initial condition to the flip-flop circuits. In cases where such types of permanent storage devices are not already available, control leads or lines are provided for enabling an erasing of the flip-flop storages, so that a defined initial condition can be achieved. In this way, however, the disadvantage that the last stored information will go astray cannot be avoided.

The present invention is based on the problem of improving the afore-mentioned flip-flop circuits with as little as possible additional investment in circuitry, in such a way that, upon reinsertion of the operating voltage, they will reassume the original circuit condition, so that it will no longer be necessary to store the last stored information into a special permanent storage device prior to the disconnection of the operating voltage, and to cause this permanent storage device to perform the resetting of the flip-flop circuit in accordance with the stored information subsequently to the insertion of the operating voltage.

According to the invention, this problem is solved by inserting into each of the two operating circuits one of two oppositely wound windings with a common ferromagnetic core having an approximately rectangular hysteresis loop, in such a way that the information stored in the trigger circuit upon disconnection of the operating voltage will remain in the core, and upon reinsertion of the operating voltage, the trigger circuit will reassume that particular operating condition corresponding to the information as stored in the core. A trigger circuit constructed in this way according to the invention, bears the advantage that the storing and reading processes which were hithereto necessary for avoiding losses of information are avoided.

Figure 1:
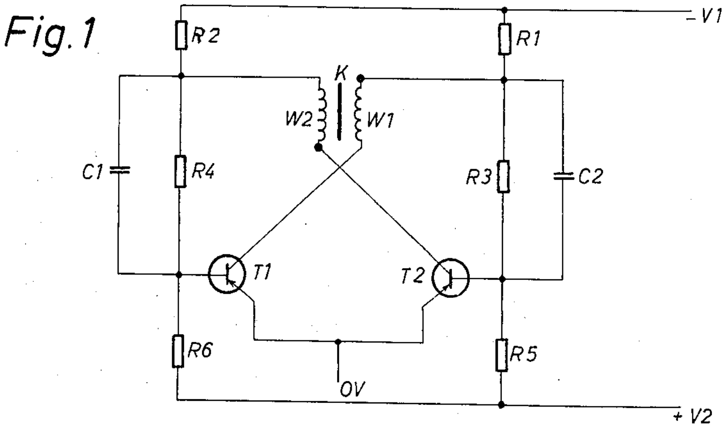
Figure 2:
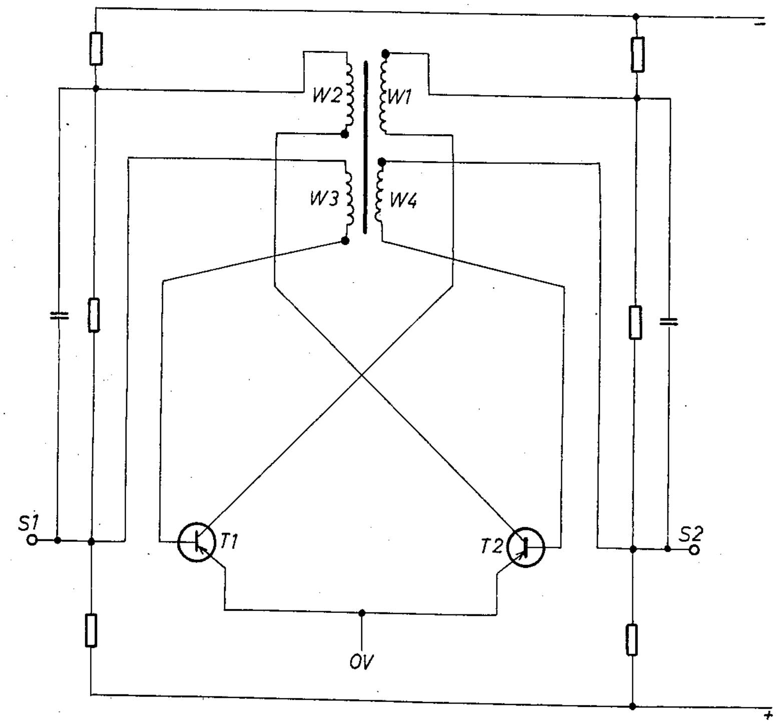

The invention is illustrated in the accompanying drawings, in which:

FIG. 1 is a schematic diagram of a transistorized flip-flop circuit embodying the invention; and FIG. 2 is a schematic diagram of a modified form of the flip-flop circuit shown in FIG. 1.

Referring to FIG. 1, a transistorized flip-flop circuit is shown comprising the transistors $T_1$ and $T_2$, as well as their respective operating resistors $R_1$ and $R_2$. The base electrodes of the transistors $T_2$ and$T_1$ are connected respectively via the resistors $R_5$ and $R_6$ to a positive potential $+V_2$, and respectively via RC-circuits $C_1R_4$ and $C_2R_3$ with the operating resistors $R_2$ and $R_1$. A winding $W_1$ is connected between the collector of transistor $T_1$ and the operating resistor $R_1$, and a winding $W_2$ is connected between the collector of transistor $T_2$ and its operating resistor $R_2$. These windings are wound in opposite sense on one common core K, consisting of ferromagnetic material. The windings are so dimensioned that whichever circuit is conductive will magnetize the core. If, for example, the transistor $T_1$ is conductive or unblocked, then a current will be flowing from ground OV, via the emitter-collector path of $T_1$, via the winding of $W_1$, and via the operating resistor $R_1$, towards the line of the negative operating potential —V1. The current flowing in the winding $W_1$ will enforce a certain condition of saturation in the core K. The voltage drop across $R_1$ will cause a relatively small current to flow across the voltage-dividing circuit consisting of the voltage-dividing resistors $R_3$ and $R_5$, so that the base electrode on the transistor $T_2$ will remain positively biased. Accordingly, the transistor $T_2$ will remain blocked. This operating condition will remain until, for example, the circuit arrangement is triggered into the other condition by the application of a negative pulse to the base electrode of the transistor $T_2$.

If $T_2$ is controlled in such a way that a current will now be flowing via the emitter-collector path of $T_2$, via the winding $W_2$ and the operating resistor $R_2$, then by the voltage drop across $R_2$, which is immediately transferred via the coupling capacitor $C_1$ to the base of the transistor $T_1$, the transistor $T_1$ will be blocked. During this relaxation or triggering process, as soon as the current in the winding $W_2$ sufficiently predominates over the current flowing in the winding $W_1$, the core K will be resaturated in the other sense. If the operating voltage is now disconnected, then the condition of remanence of the core will indicate in what operating condition the trigger circuit had been prior to the disconnection of the operating voltage. Upon reconnecting or reinserting the operating voltage, the trigger circuit is at first in an unstable condition, that is, neither of the two circuits is conducting its complete or full current. With respect to the circuit which had been blocked prior to the disconnection, the core will represent a high impedance, as soon as the current in this circuit and in the core winding produces a field tending to resaturate the core, in other words, is trying to shift the core from the saturation condition into the area of a high permeability. With respect to the other circuit, however, the core represents a small impedance, because in this circuit no current flow is necessary to further drive the core into the saturation condition. This asymmetry of the trigger circuit forces it to return to the condition which is assumed prior to the disconnection.

A particularly advantageous amplification of this effect can be achieved by providing two further windings which are inserted into the connections between the control electrodes and the lead-in conductors of the control lines. The arrangement is such that the circuit which tends to resaturate the core upon insertion or connection of the operating voltage is blocked by the voltage as induced in the additional winding. In the embodiment of FIG. 2, these additional windings are denoted by the references $W_3$ and $W_4$. The base electrode of the transistor $T_1$ is its control electrode and is connected via the winding $W_3$ with the control line $S_1$, and the base electrode of the transistor $T_2$ is connected via the winding $W_4$ with the control line $S_2$.

If, for example, prior to the disconnection of the operating voltage, the transistor $T_1$ had been conductive or unblocked, and the operating voltage is reinserted again, then the current flow which is effected through the winding $W_1$ is no longer capable of resaturating the core. However, if in the unstable initial condition, the transistor $T_2$ has a greater conductivity at first, the current via the winding $W_2$ could initiate a resaturation. In the course of this, however, a blocking signal with respect to the transistor $T_2$ is induced in the control winding $W_4$. At the same time, an opposite signal adapted to trigger the transistor $T_1$ into the conductive or unblocked condition is induced in the winding $W_3$.

The described embodiments relate to transistorized flip-flop circuits. The invention, however can also be advantageously applied to other circuits, such as tube circuits.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A bistable trigger circuit comprising two transistors connected to form a flip-flop circuit, said circuit comprising a ferro-magnetic core with an approximately rectangular hysteresis loop, a pair of oppositely wound windings on said core, means connecting one of said windings to a first electrode of one of said transistors, means connecting the other of said windings to a corresponding first electrode of the other of said transistors, a source of potential, a pair of operating resistors connected respectively between the other ends of said windings and said source, and separate means connecting each junction of a winding and a resistor to a second electrode of the transistor whose first electrode is not connected to said winding, whereby, upon disconnecting said source, the information as stored in said trigger circuit will remain in said core, and upon reconnecting said source, said trigger circuit will resume that particular operating condition that corresponds to the information as stored in said core.

2. A bistable trigger circuit, as claimed in claim 1, in which the two windings on the core are connected respectively between the collectors and the operating resistors of the transistors.

3. A bistable trigger circuit, as claimed in claim 2, further comprising a control lead for each transistor, and in which the ferro-magnetic core is provided with two further windings which are respectively inserted between the bases and the control leads of two transistors.

References Cited in the file of this patent

UNITED STATES PATENTS

| | | |
|---|---|---|
| 2,760,088 | Pittman et al. | Aug. 21, 1956 |
| 2,772,370 | Bruce et al. | Nov. 27, 1956 |
| 2,774,878 | Jensen | Dec. 18, 1956 |
| 2,875,351 | Collins | Feb. 24, 1959 |
| 2,913,708 | Paull | Nov. 17, 1959 |